(12) United States Patent
Hendrick

(10) Patent No.: US 11,988,875 B2
(45) Date of Patent: *May 21, 2024

(54) MULTI-FERRULE ANGLED POLISHED CONNECTOR WITH SIMPLIFIED POLARITY REVERSAL

(71) Applicant: US Conec, Ltd., Hickory, NC (US)

(72) Inventor: Jeff Hendrick, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,073

(22) Filed: Dec. 15, 2023

(65) Prior Publication Data

US 2024/0111099 A1    Apr. 4, 2024

Related U.S. Application Data

(63) Continuation of application No. 17/692,577, filed on Mar. 11, 2022, which is a continuation of application No. PCT/US2020/050463, filed on Sep. 11, 2020.

(60) Provisional application No. 62/899,900, filed on Sep. 13, 2019.

(51) Int. Cl.
*G02B 6/38* (2006.01)
*G02B 6/40* (2006.01)

(52) U.S. Cl.
CPC ......... *G02B 6/3822* (2013.01); *G02B 6/3831* (2013.01); *G02B 6/406* (2013.01)

(58) Field of Classification Search
CPC ..... G02B 6/3822; G02B 6/3831; G02B 6/406
See application file for complete search history.

(56) References Cited

U.S. PATENT DOCUMENTS

| 8,152,385 | B2 | 4/2012 | de Jong et al. |
| 10,788,628 | B2 | 9/2020 | Ott et al. |
| 11,886,016 | B2* | 1/2024 | Hendrick ............... G02B 6/406 |
| 2006/0269194 | A1* | 11/2006 | Luther ................. G02B 6/3863 385/85 |
| 2015/0277059 | A1 | 10/2015 | Raven et al. |
| 2017/0205587 | A1 | 7/2017 | Chang et al. |
| 2017/0293088 | A1 | 10/2017 | Manes et al. |
| 2018/0088288 | A1 | 3/2018 | Taira et al. |
| 2019/0243072 | A1* | 8/2019 | Takano ............... G02B 6/38875 |
| 2019/0339458 | A1 | 11/2019 | Pimpinella |

(Continued)

FOREIGN PATENT DOCUMENTS

| EP | 1390787 B1 | 3/2006 |
| EP | 1783522 A1 | 5/2007 |
| JP | H05333240 A | 12/1993 |

OTHER PUBLICATIONS

ISA/KR, International Search Report and Written Opinion for corresponding PCT Patent Application No. PCT/US2020/050463, mailed Dec. 22, 2020, 8 pages.

(Continued)

*Primary Examiner* — Sung H Pak
*Assistant Examiner* — Hoang Q Tran
(74) *Attorney, Agent, or Firm* — NK Patent Law

(57) ABSTRACT

A fiber optic connector has at least two optical fibers therein have end faces that are positioned such that they are directed in different directions. The end faces can be oriented relative to a key that is provided on a fiber optic connector housing that has a central opening in the main body of the fiber optic connector.

18 Claims, 4 Drawing Sheets

(56) References Cited

U.S. PATENT DOCUMENTS

2020/0041727 A1     2/2020   Yamamoto
2020/0156208 A1     5/2020   Wong

OTHER PUBLICATIONS

WIPO, International Preliminary Report on Patentability for corresponding PCT Patent Application No. PCT/US2020/050463, dated Mar. 15, 2022, 6 pages.
USPTO, Non-Final Office Action for corresponding U.S. Appl. No. 17/018,508, mailed Nov. 16, 2020, 13 pages.
USPTO, Final Office Action for corresponding U.S. Appl. No. 17/018,508, mailed Mar. 19, 2021, 14 pages.
USPTO, Non-Final Office Action for corresponding U.S. Appl. No. 17/018,508, mailed Aug. 16, 2021, 16 pages.
USPTO, Final Office Action for corresponding U.S. Appl. No. 17/018,508, mailed Dec. 8, 2021, 16 pages.
USPTO, Non-Final Office Action for corresponding U.S. Appl. No. 18/179,780, mailed Jul. 12, 2023, 12 pages.
EPO, Extended European Search Report for corresponding European Patent Application No. 20862148.2, mailed Sep. 7, 2023, 9 pages.
CNIPA, 1st Office Action for corresponding Chinese Patent Application No. 202080063791.6, dated Oct. 26, 2023, 14 pages.
USPTO, Non-Final Office Action for corresponding U.S. Appl. No. 17/692,577, dated Feb. 16, 2024, 10 pages.

\* cited by examiner

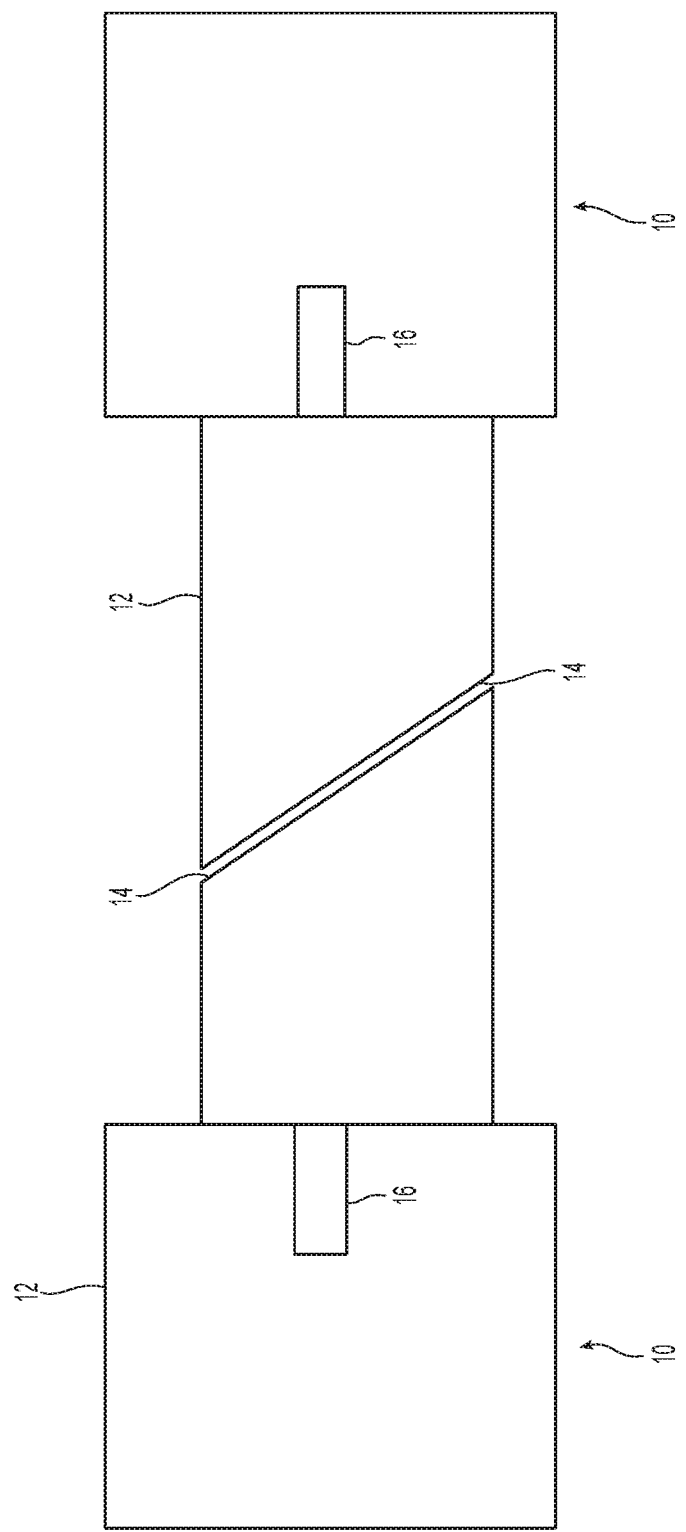

MULTI-FERRULE ANGLED POLISHED CONNECTOR WITH SIMPLIFIED POLARITY REVERSAL

REFERENCE TO RELATED CASE

This application is a continuation of U.S. patent application Ser. No. 17/692,577 filed Mar. 11, 2022, which is a continuation of PCT patent application no. PCT/US2020/050463 filed Sep. 11, 2020, which claims priority under 35 U.S.C. § 119 (e) to U.S. provisional application No. 62/899,900 filed Sep. 13, 2019, the contents of all of which are hereby incorporated by reference in their entireties.

BACKGROUND OF THE INVENTION

Optical transmission systems utilizing multi-fiber fiber optic connectors and multiple optical fibers require polarity to ensure proper communication between optical transmitters and receivers. Some fiber optic connectors have a visual indicator for the polarity of the fiber optic connector while others do not. For certain applications, the end faces of the fiber optic ferrules are polished at an angle to reduce back reflections into the optical fiber at a connection point.

Current multi-ferrule connectors (e.g., duplex connectors or connectors with multiple fiber optic ferrules) in which the fiber optic ferrules have an angled end face orient the polished end faces of the ferrules in the same direction. As illustrated in FIG. 1, the angled end faces of the fiber optic ferrules face the same direction. The direction of the end face would be the same if the fiber optic connector were a single fiber connector, e.g., an LC or an SC connector. For multi-fiber fiber optic connectors, the second fiber optic ferrule is behind the first fiber optic ferrule in profile. This can be seen in FIG. 2, which illustrates the side view of a duplex fiber optic connector with the fiber optic ferrules angled in the same direction and aligned with a key on the fiber optic connector housing/body. This similar direction of end face polishing is based on current single fiber connectors (SC and LC) and allows a fiber optic connector (simplex or duplex) to properly mate with another opposing connector because the angled end faces of the connector and the opposing mating connector are opposite when connected (e.g., through an adapter).

For duplex fiber optic connectors, polarity reversal allows a user to reverse the fiber optic ferrule orientation in relation to the connector housing (or key) to correct for improper system design. For multi-ferrule flat polished fiber optic connectors, polarity is reversed by simply changing fiber optic ferrule location. To reverse polarity of current duplex angled polished fiber optic connectors, the fiber optic ferrules must change locations and also both ferrules must rotate 180 degrees due to the orientation of the fiber optic ferrule end face angles. This is typically a multi-step process in which the change in fiber optic ferrule location is accomplished by rotating the key, which may be present on the inner housing or the outer housing of the fiber optic connector, in relation to the connector. Then, a separate rotation of each ferrule with some sort of tool is carried out to maintain the correct end face angle of the fiber optic ferrule for proper mating. This adds to the time and cost when many such connectors are being adjusted for polarity in the field. Further, the requirement of having an additional tool to rotate the angle-polished ferrules also adds to the bill of parts, and increases the chances of ferrule damage and/or damage to the optical fiber tips.

Thus, an easier and less expensive alternative is required to allow for the polarity reversal of the fiber optic connectors, and in particular, the duplex connectors or multi-fiber multiple-ferrule connectors with angled polished ferrules.

SUMMARY OF THE INVENTION

The present invention is directed to a duplex connector that includes a main body having a central opening, a first fiber optic ferrule disposed at least partially within the central opening in the main body and having an end face with a first orientation; and a second fiber optic ferrule disposed at least partially within the central opening in the main body and having an end face in a second orientation, the first orientation being different from the second orientation.

In some embodiments, the first fiber optic ferrule has a first longitudinal axis, the first fiber optic ferrule being in a rotated position about its first longitudinal axis by a predetermined angle relative to the second fiber optic ferrule.

In some embodiments, the second fiber optic ferrule has a second longitudinal axis and the first and second longitudinal axes are parallel to one another.

In other embodiments, the first orientation comprises a first plane in which at least a portion of the end face of the first fiber optic ferrule lies and the second orientation comprises a second plane in which at least a portion of the end face of the second fiber optic ferrule lies.

In some embodiments, the end faces of the first fiber optic ferrule and the second fiber optic ferrule are in a polished state together in the main body before having respective orientations changed relative to one another.

In yet another aspect, there is a multi-ferrule connector that includes a housing having a polarity key at a first position on the housing, a pair of fiber optic ferrules disposed at least partially inside the housing, one of the pair of fiber optic ferrules having an endface that is at a first angle relative to the polarity key and the other of the pair of fiber optic ferrules having an end face at a second angle relative to the polarity key, wherein the second angle is different from the first angle.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 3 is top elevational view of two prior art duplex fiber optic connectors in a mated relationship;

DETAILED DESCRIPTION OF THE INVENTION

Figure 2:
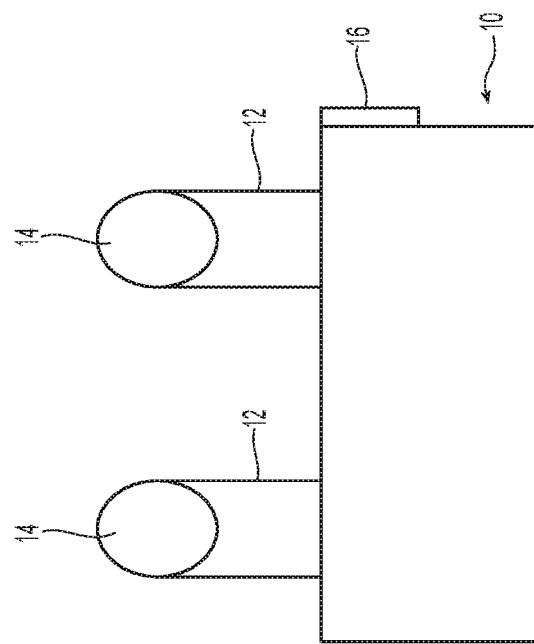
FIG. 2 is a side elevational view of a schematic of the prior art duplex fiber optic connector in FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
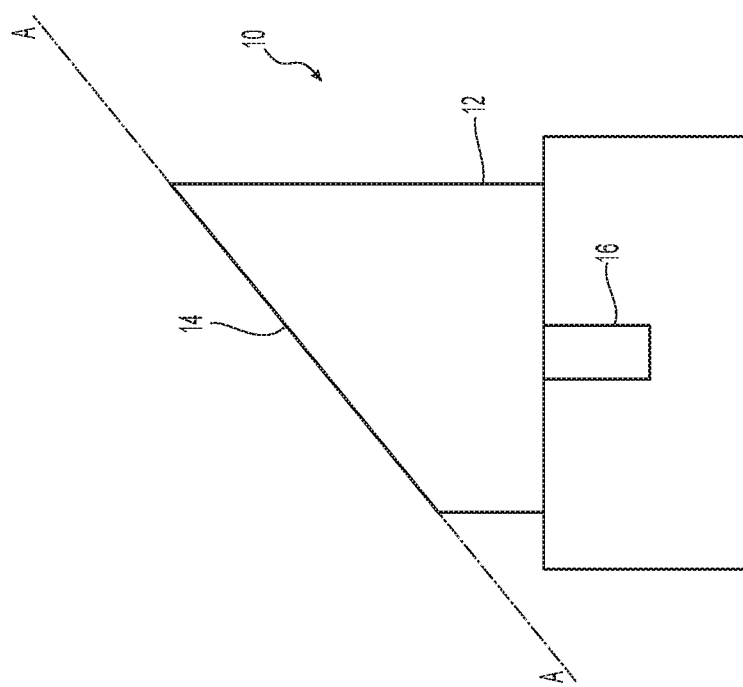
FIG. 1 is a top elevational view of a schematic of a portion of a prior art duplex fiber optic connector.

Illustrated in FIGS. 1-3 are prior art duplex fiber optic connectors 10 with fiber optic ferrules 12 that have had the end faces 14 polished. Each of the fiber optic ferrules 12 supports an optical fiber therein. The fiber optic ferrules 12 are disposed within a fiber optic connector 10 that has a key 16 to orient the fiber optic connector 10 to a receptacle, such as an adapter, a panel, etc. The fiber optic ferrules 12 are typically polished at an angle, usually about 8°, relative to a direction of optical beam propagation within the optical fiber inside each of the fiber optic ferrules 12. In certain scenarios, this angle may lie within a range of 4°-10°. The fiber optic ferrules 12 are usually all polished at the same time, and that is when they are disposed within the fiber optic connector 10. The key 16 is schematically illustrated as a rectangular element, but it could have any of a number of configurations and be located on different parts of the fiber optic connector 10. The end faces 14 are therefore in a single plane A. Further, it is known to one of ordinary skill in the art that when the ferrules are polished, the optical fibers therein (including a core) are polished simultaneously. This is carried out using standard polishing jigs available in the industry.

FIG. 2 shows the same fiber optic connector 10 with the same fiber optic ferrules 12 (polished) as in FIG. 1. In FIG. 2, it becomes clear that there are two fiber optic ferrules 12 in the fiber optic connector 10, but one of the fiber optic ferrules 12 is hiding from view in FIG. 1. In FIG. 3, there are two such fiber optic connectors 10 in a schematic showing of the mating of the two fiber optic connectors 10. In this case, the fiber optic connectors 10 are mated key-up to key-up. This allows for the fiber optic ferrules 12 to be in close physical relationship to one another.

In a situation where the system has a design problem, and the fiber optic connector 10 needs to have its polarity changed (e.g., key-up needs to be key-down), then not only does the fiber optic connector 10 need to be rotated relative to the other fiber optic connector 10 in the mating, but the fiber optic ferrules 12 would also need to be rotated relative to the fiber optic connector 10. This is done to ensure that the fiber optic ferrules 12 still orient in the same direction to be able to mate in a configuration similar to that shown in FIG. 3, albeit with the relative positions of two fiber optic ferrules 12 being swapped with each other. This rotation would require a tool, time and some expertise to make such a change in the fiber optic connector 10. It may not even be possible to perform this change without substantial disassembly of the fiber optic connector 10. Any time any of the fiber optic ferrules 12 is directly handled to change polarity, there is a risk of dislodging the ferrule and/or the optical fibers, or scratching a tip of the optical fiber causing damage to the optical fiber, and hence the overall setup. Thus, it is prudent to avoid handling the ferrules in the field to the extent possible.

Figure 5:
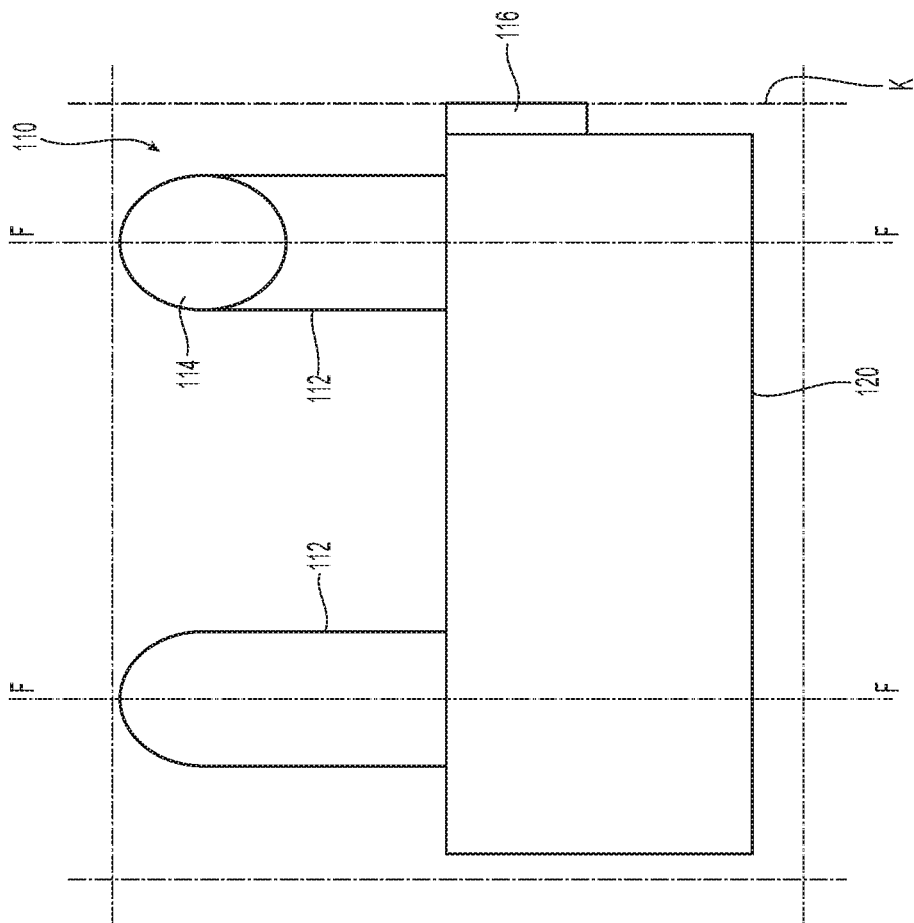
FIG. 5 is a side elevational view of a schematic of the duplex fiber optic connector in FIG. 4.
Figure 4:
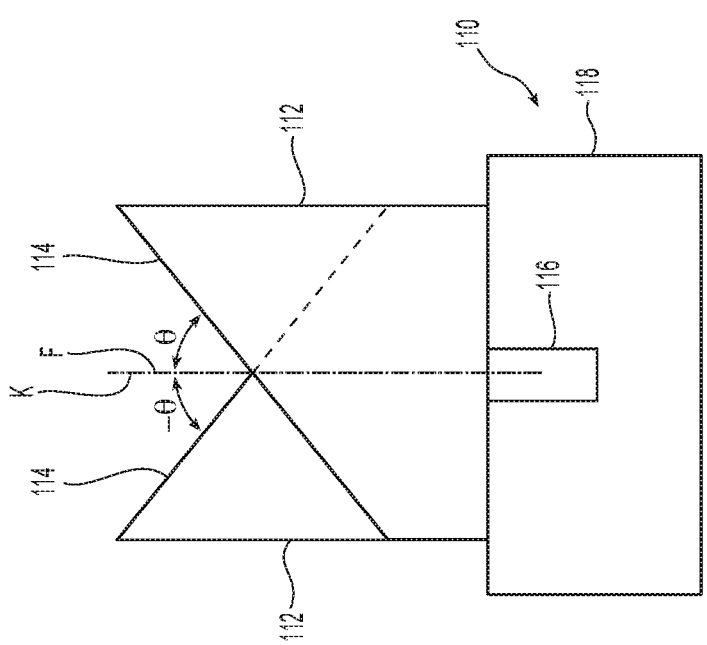
FIG. 4 is a top elevational view of a schematic of one embodiment of a portion of a duplex fiber optic connector according to the present invention.
Figure 6:
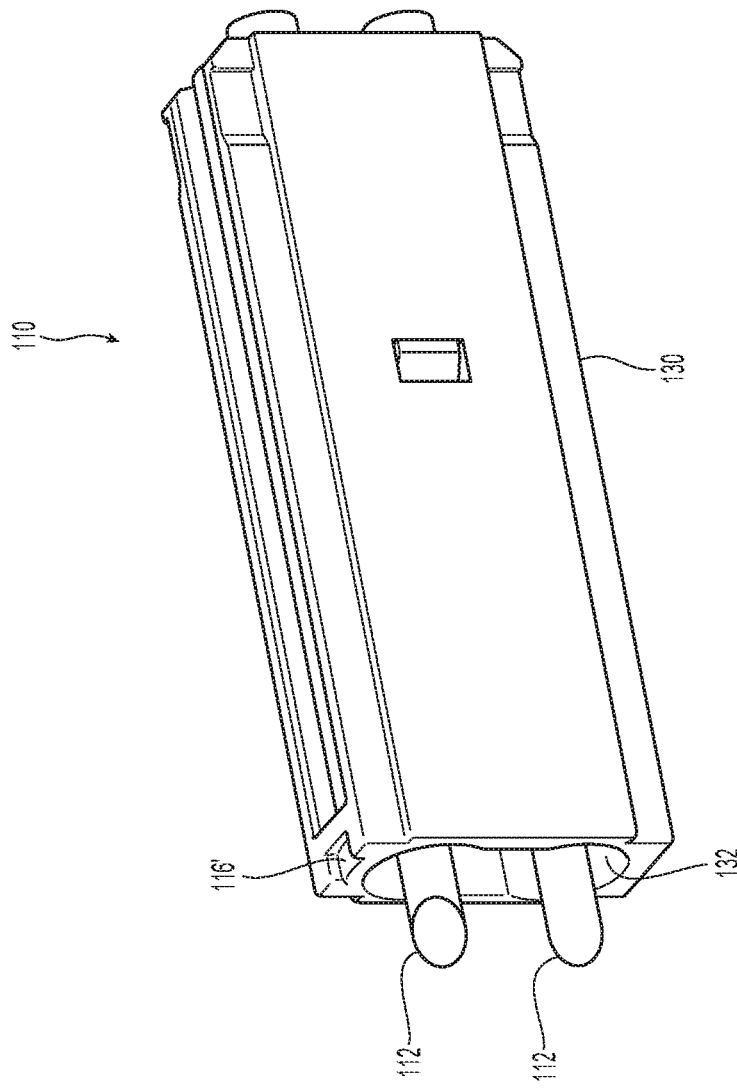
FIG. 6 is a perspective view of one embodiment of a duplex fiber optic connector in which the present invention can be used.

Thus, in FIGS. 5 and 6, there is represented a fiber optic connector 110 according to one embodiment of the present invention. The fiber optic connector 110 has two fiber optic ferrules 112 disposed therein, each of the fiber optic ferrules 112 has an end face 114. Accordingly, the fiber optic connector 110 is interchangeable referred to herein as a "duplex connector," although multi-fiber connectors with more than one pair of fiber optic ferrules 112 could be utilized in accordance with various aspects of this invention. As seen in FIG. 5, each of the fiber optic ferrules 112 has a longitudinal axis F. The fiber optic connector 110 also has a polarity key 116 (interchangeably referred to herein as "key 116") to orient the fiber optic connector 110 relative to the receptacle and/or another fiber optic connector 110. In this case, the end faces 114 of the fiber optic ferrules 112 do not lie in the same plane in the finished fiber optic connector 110. That is, they have different orientations to one another—one faces one way and the other optical fiber faces a different way. In FIG. 4, the front optical fiber 112 faces to the left while the back or rear optical fiber 112 (partially hidden) faces to the right. In the case where only a portion of the end face 114 of the optical fiber 112 is polished, it is the polished portion that should be referenced with regard to the orientation of the optical fiber 112. The polished portion includes the tips of the optical fibers supported by the fiber optic ferrules 112.

It should be noted that after the installation of the fiber optic ferrules 112 in the fiber optic connector 110, the fiber optic ferrules 112 are polished. At that point, the end faces 114 would lie in the same plane (i.e., have the same orientation); however, one of the fiber optic ferrules 112 is then rotated relative to the other fiber optic ferrule 112 and the fiber optic connector 110. In FIGS. 4 and 5, one of the fiber optic ferrules 112 has been rotated 180° relative to the fiber optic connector 110 and the other fiber optic ferrule 112. The end faces of the first fiber optic ferrule 112 and the second fiber optic ferrule 112 are in a polished state together in the main body 130 before having respective orientations changed relative to one another. Preferably the same fiber optic ferrule 112 is rotated in each of the fiber optic connectors 110 to assure that the polarity can be easily switched in the field by merely rotating the fiber optic connector 110 relative to the other fiber optic connector to which it is to be mated (or to an adapter or an adapter panel). To achieve this, in an alternative embodiment, one of the fiber optic ferrules 112 may be fixed and cannot be rotated, for example, due to anti-rotation features inside the main body 130. Once rotated, a polarity of the of the fiber optic connector 110 is changed from a first polarity to a second polarity by rotating the fiber optic connector 110 by 180° thereby rotating the polarity key, without a rotation of the fiber optic ferrules 112 relative to the polarity key. That is, there is no subsequent turning of any of the fiber optic ferrules 112 after connectorization. As a result, the end user does not need to handle or touch the fiber optic ferrules 112 for changing the polarity or otherwise, thereby reducing the chances of any damage to the fiber optic connector 110.

As used herein, the fiber optic connector can mean a fiber optic connector that has many constituent parts, or merely a housing that contains the fiber optic ferrules 112. Illustrated in FIG. 6 is a portion of one such fiber optic connector 110, which is the MDC connector that is manufactured and sold by the Applicant, US Conec, Ltd. In each case, the fiber optic connector would have a main body (e.g., 130) that receives in a central opening 132 the fiber optic ferrules 112 and would also have a key 116'. The location of the key 116/116' is not critical to the fiber optic connector except for the relationships to the fiber optic ferrules 112 that are described below and elsewhere herein. This means that the key may take on a number of different configurations and locations. While the key 116 is illustrated to be on the outer surface 118 of the short side of the fiber optic connector 110, it could be on the outer surface 120 of the long side.

Further, in an alternative embodiment, the key 116/116' may not be present. That is, the key 116/116' may be optional. However, there may be a different type of a visual indicator, either on the one of the fiber optic ferrules 112 or the housing of the main body 130 that may achieve the same end result as the key 116/116'. For example, the visual indicator may be a color mark on one of the fiber optic ferrules 112, or on the housing. Still alternatively, a clearly visible textual imprint on the housing may serve the same purpose.

The key 116 lies in a plane K that also contains the longitudinal axes F of the fiber optic ferrules 112. See FIGS. 4 and 5. The end faces 114 of the fiber optic ferrules 112 are polished at an angle θ relative to the plane K. One of the polished endfaces is at a positive angle θ relative to the plane K, while the other is at a negative angle θ relative to the plane K. Naturally, they would be the same in opposite directions given that they would have been polished at the same time. However, it is possible to have different values of the angle θ for each of the end faces 114. The plane K when viewed from the top side of the key 116, e.g., in FIG. 4, forms a plane of symmetry about which the end faces 114 are oriented in different orientations. That is, the first fiber optic ferrule 112 has a first orientation and the second fiber optic ferrule 112 has a second orientation that is different from the first orientation. These different orientations are opposite of each other about the plane K, for example, in the view shown in FIG. 4.

In an alternative embodiment, the fiber optic connector 110 may be a duplex connector with two separate housings for each ferrule. This configuration is similar to the current LC type duplex connector, although the footprint of the fiber optic connector 110 in this alternative embodiment is smaller than the LC type duplex connector, for example, set to industry standards such as QSFP-DD. Still alternatively, the invention is equally applicable to LC type duplex connectors with end faces 114 polished at an angle θ as shown in FIGS. 4-6, and then one of the fiber optic ferrules is turned to an angle −θ after polishing. In this embodiment, the main body 130 of the fiber optic connector 110 has a front end where the end face 114 are and a rear end where the optical fibers (not shown) enter the fiber optic connector 110. Instead of having a single common central opening 132, the first fiber optic ferrule 112 and the second fiber optic ferrule 112 have two separate central openings. Each of the first fiber optic ferrule 112 and the second fiber optic ferrule 112 are at least partially positioned in the respective first central opening and the second central opening. Such a separation may be made via a wall in the central opening 132. This wall may lie parallel to the plane K. Alternatively, there may be a space between the first central opening and the second central opening, similar to an LC duplex connector.

It will be appreciated by one of ordinary skill in the art that while a duplex connector having a pair of ferrules is described herein, the invention is extendable to additional pairs of ferrules in housings. In that case half of the ferrules will have end faces in one orientation, and the other half in a different orientation, for example, when viewed in the view shown in FIG. 4. That is, the invention is applicable to ganged multi-ferrule connectors with 2, 4, 6, or 8 ferrules, for example.

In yet another embodiment of this invention, a method for assembling the fiber optic connector 110 is provided. The method includes disposing a first fiber optic ferrule 112 and a second fiber optic ferrule 112 in the central opening 132 of the main body 130 of the fiber optic connector 110. The method includes polishing an end face 114 of the first fiber optic ferrule 112 and an end face 114 of the second fiber optic ferrule 112, wherein the polished end faces 114 are directed in a first direction. The method includes moving one of the first fiber optic ferrule 112 and the second fiber optic ferrule 112 relative to the other, whereby one of the endfaces 114 is directed in a second direction, the second direction is different from the first direction. The step of moving one of the first fiber optic ferrule 112 and the second fiber optic ferrule 112 comprises moving only one of the first fiber optic ferrule 112 and the second fiber optic ferrule 112. The step of moving one of the first fiber optic ferrule 112 and the second fiber optic ferrule 112 comprises rotating the first fiber optic ferrule 112 about its longitudinal axis F through a predetermined angle θ relative to the second fiber optic ferrule 112. In one aspect, the predetermined angle θ is 180°.

In one aspect, the step of moving one of first fiber optic ferrule 112 and the second fiber optic ferrule 112 relative to the other includes inserting the fiber optic connector 110 in an adapter on a first side, with one of the first fiber optic ferrule 112 and the second fiber optic ferrule 12 being exposed on a second side of the adapter. Such an adapter may be known in the art. The step of moving then includes inserting a polarity tool into the second side of the adapter, the polarity tool engaging a portion of a ferrule holder inside the main body 130 for the exposed fiber optic ferrule 112. Such a ferrule holder is also known in the art. Finally, the step of moving includes turning the polarity tool to rotate the exposed fiber optic ferrule 112 relative to the other fiber optic ferrule 112 through a predetermined angle. As noted, this predetermined angle may be 180°.

The method includes providing the polarity key 116/116' on the main body 130 of the fiber optic connector 110. The step of providing includes providing the polarity key 116/116' on the long side or the short side of the housing of the main body 130. The fiber optic ferrules 112 may be oriented differently relative to the polarity key 116/116' after the above-noted step of moving.

Once the fiber optic ferrules 112 are oppositely or differently oriented and the end faces 114 are facing in different directions, for changing polarity of the fiber optic connector 110, the method includes flipping or rotating the fiber optic connector 110 by 180°, without a rotation of the fiber optic ferrules 112 relative to the polarity key 116/116'.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:
1. A duplex fiber optic connector comprising:
a housing having a length along a longitudinal axis, a width along a lateral axis and a height along a transverse axis, the height being larger than the width,
wherein the housing has a top side, a bottom side, and a pair of opposing sides joining the top side to the bottom side, the housing further defining a central opening at a terminal end of the opposing sides, the terminal end of the opposing sides defining an end face of the housing that extends around a continuous circumfer- ence thereof, a first ferrule supporting a first optical fiber, the first ferrule having an end face at an angle relative to the longitudinal axis;
a second ferrule supporting a second optical fiber, the second ferrule also having an end face at another angle relative to the longitudinal axis, wherein, the first and the second ferrules are positioned for mating the duplex fiber optic connector with the another duplex fiber optic connector, wherein the angle of the first ferrule is offset from the angle of the second ferrule in a mating position of the first and the second ferrules with corresponding ferrules of the another duplex fiber optic connector, the first ferrule and the second ferrule being at least partially surrounded by the housing; and
a key located on the top side of the housing,
wherein the key is configured to orient the duplex fiber optic connector relative to a receptacle or another duplex fiber optic connector;
wherein the key protrudes outwardly of the housing,
wherein the first ferrule and the second ferrule each begin at a position within the housing and rearwardly of the central opening of the housing,
wherein the respective end faces of the first ferrule and the second ferrule are exposed at a front end of the housing by protruding beyond the front end of the housing,
wherein the duplex fiber optic connector has a first polarity in which the angle of the end face of the first ferrule and the angle of the end face of the second ferrule are positioned relative to the key, and a second polarity in which the angle of the end face of the first ferrule and the angle of the end face of the second ferrule are positioned relative to the key the same as in the first polarity,
wherein the first ferrule and the second ferrule are at a same fixed orientation relative to the housing in both the first polarity and the second polarity of the duplex fiber optic connector.

2. The duplex fiber optic connector according to claim 1, wherein the central opening is a single common central opening, wherein the single common central opening is generally oval shaped at the front end of the housing.

3. The duplex fiber optic connector according to claim 1, wherein the central opening comprises a first opening and a second opening with a wall therebetween.

4. The duplex fiber optic connector according to claim 1, wherein a part of the central opening extends to a rear portion of the housing.

5. The duplex fiber optic connector according to claim 2, wherein the key lies in a plane containing the longitudinal axis, and wherein the first ferrule and the second ferrule are positioned generally parallel to the longitudinal axis.

6. The duplex fiber optic connector according to claim 2, wherein the key is located on one of the top side or the bottom side of the housing.

7. The duplex fiber optic connector according to claim 1, wherein the angles of the respective end faces are opposing relative to a plane between the first ferrule and the second ferrule, the plane being parallel to the longitudinal axis between a front end and a rear end of the housing.

8. The duplex fiber optic connector according to claim 1, wherein the duplex fiber optic connector has a footprint of a QSFP-DD fiber optic connector.

9. The duplex fiber optic connector according to claim 1, wherein the first ferrule and the second ferrule do not rotate relative to the housing between the first polarity and the second polarity.

10. A duplex fiber optic connector comprising:
a housing having a length along a longitudinal axis, a width along a lateral axis and a height along a transverse axis, the height being larger than the width,
wherein the housing has a top side, a bottom side, and a pair of opposing sides joining the top side to the bottom side,
wherein the housing further defines a central opening at a terminal end of the opposing sides, the terminal end of the opposing sides defining an end face of the housing that extends around a continuous circumference thereof;
a first ferrule supporting a first optical fiber, the first ferrule having an end face;
a second ferrule supporting a second optical fiber, the second ferrule also having an end face, the first ferrule and the second ferrule being at least partially surrounded by the housing; and
a key located on the housing,
wherein the key is configured to orient the duplex fiber optic connector relative to a receptacle or another duplex fiber optic connector
wherein the key protrudes outwardly of the housing,
wherein the respective end faces of the first ferrule and the second ferrule are exposed at and protruding beyond a front end of the housing, and
wherein the end face of the first ferrule is angled toward a first of the pair of opposing side surfaces and the end face of the second ferrule is angled toward a second of the pair of opposing side surfaces, and an orientation of the end face of the first ferrule relative to an orientation of the end face of the second ferrule being opposite,
wherein the first and second ferrules are positioned for mating the duplex fiber optic connector with another duplex fiber optic connector,
wherein the duplex fiber optic connector has a first polarity in which the angle of the end face of the first ferrule and the angle of the end face of the second ferrule are positioned relative to the key, and a second polarity in which the angle of the end face of the first ferrule and the angle of the end face of the second ferrule are positioned relative to the key the same as in the first polarity,
wherein the first ferrule and the second ferrule are at a same fixed orientation relative to the housing in both the first polarity and the second polarity of the duplex fiber optic connector.

11. The duplex fiber optic connector according to claim 10, wherein the orientation of the end face of the first ferrule is different by 180° from the orientation of the end face of the second ferrule about a plane passing through the first ferrule and the second ferrule.

12. The duplex fiber optic connector according to claim 11, wherein the first ferrule and the second ferrule do not rotate relative to the housing between the first polarity and the second polarity.

13. A duplex fiber optic connector comprising:
a housing having a length along a longitudinal axis, a width along a lateral axis and a height along a transverse axis, the height being larger than the width,
wherein the housing has a top side, a bottom side, and a pair of opposing sides joining the top side to the bottom side,
wherein the housing further defines a central opening at a terminal end of the opposing sides, the terminal end of the opposing sides defining an end face of the housing that extends around a continuous circumference thereof;

a first ferrule supporting a first optical fiber, the first ferrule having an end face that is at a non-perpendicular angle to the longitudinal axis;

a second ferrule supporting a second optical fiber, the second ferrule also having an end face that is at a non-perpendicular angle to the longitudinal axis, the first ferrule and the second ferrule being at least partially surrounded by the housing; and a key located on the top side of the housing, wherein the key protrudes outwardly of the housing, wherein the key is configured to orient the duplex fiber optic connector relative to a receptacle or another duplex fiber optic connector;

wherein the respective end faces of the first ferrule and the second ferrule are exposed at a front end of the housing at opposite angular orientations relative to the housing, and wherein the first ferrule and the second ferrule are spaced apart between the top side and the bottom side along the height of the housing, and wherein the duplex fiber optic connector is configured for engaging a boot positioned rearward of the housing and partially surrounding a fiber optic cable having the first optical fiber and the second optical fiber, wherein the first ferrule and the second ferrule are positioned for mating the duplex fiber optic connector with another duplex fiber optic connector, wherein the duplex fiber optic connector has a first polarity in which the angle of the end face of the first ferrule and the angle of the end face of the second ferrule are positioned relative to the key, and a second polarity in which the angle of the end face of the first ferrule and the angle of the end face of the second ferrule are positioned relative to the key the same as in the first polarity, wherein the first ferrule and the second ferrule are at a same fixed orientation relative to the housing in both the first polarity and the second polarity of the duplex fiber optic connector.

14. The duplex fiber optic connector according to claim 13, wherein the housing is a single housing for both the first ferrule and the second ferrule.

15. The duplex fiber optic connector according to claim 13, wherein the duplex fiber optic connector has a footprint of a QSFP-DD fiber optic connector.

16. The duplex fiber optic connector according to claim 13, wherein the non-perpendicular angles of the respective end faces are opposing relative to a plane between the first ferrule and the second ferrule, the plane being parallel to the longitudinal axis between a front end and a rear end of the housing.

17. The duplex fiber optic connector according to claim 13, wherein the housing has a central opening to receive the first ferrule and the second ferrule from a rear end.

18. The duplex fiber optic connector according to claim 13, wherein the first ferrule and the second ferrule do not rotate relative to the housing between the first polarity and the second polarity.

* * * * *